Patented Mar. 13, 1934

1,950,663

UNITED STATES PATENT OFFICE 1,950,663

MANUFACTURE OF CELLULOSE ESTERS

Henry Dreyfus, London, England

No Drawing. Application November 24, 1928, Serial No. 321,751. In Great Britain December 17, 1927

15 Claims. (Cl. 260—101)

This invention relates to a new or improved process for the manufacture of cellulose acetate and cellulose esters of higher homologues of acetic acid, for example of propionic acid or butyric acid.

According to the present invention cellulosic materials are esterified by means of fatty acid anhydrides, and especially acetic anhydride, in presence of a condensing agent comprising stannic chloride or other stannic halide in presence or absence of hydrochloric acid or other hydrohalic acid.

Stannous chloride has previously been proposed for use as condensing agent in the acetylation of cellulose but the results obtained are altogether unsatisfactory. So far as I am aware stannic chloride has not hitherto been used.

After considerable research on the subject of the acetylation of cellulose in presence of metallic salts, I have discovered that very valuable clear esterification solutions are obtainable without serious degradation of the cellulose molecule by employing stannic chloride as catalyst. Furthermore I have found that still better results are obtained if the stannic chloride be employed in conjunction with hydrochloric acid. Excellent results are also obtainable when the esterification is carried out so that the ester produced does not go into solution.

The reaction time will depend upon the proportions of stannic chloride and of hydrochloric acid (if used) and upon the temperature employed. With small proportions of stannic chloride such as 2–3% calculated on the cellulose with or without a small proportion of hydrochloric acid, such as 2%, the acetylation or other esterification takes a considerable time and from the point of view of accelerating the reaction and decreasing the time it is better to increase the quantity of stannic chloride to over 5% for example to 7–10% or more. The best results appear to be obtained when the stannic chloride is present in a proportion of 7–25%, while if hydrochloric acid be employed together with the stannic chloride both are preferably present in the proportion of 5–15%. The quantity of stannic chloride may be increased to 30 or 50% or more, but it is preferable not to increase it beyond 50%. Larger quantities than 15% of hydrochloric acid may of course be used, but no advantage is gained thereby.

I have further found that valuable results may also be obtained by replacing the stannic chloride wholly or partly by stannic bromide or stannic iodide or mixtures thereof and/or (where mixtures of stannic salt and acid are used) by replacing the hydrochloric acid wholly or partly by hydrobromic acid or hydriodic acid or mixtures thereof.

I may moreover use the catalysts of the present invention in conjunction with halides, and particularly chlorides of iron (especially ferric), manganese, copper, nickel or cobalt.

As initial cellulosic materials for acetylation or esterification cotton or other celluloses or near conversion products thereof may be employed, or wood pulps, such as sulphite pulp, soda pulp, sulphate pulp or mechanical wood pulps, or bamboo, esparto or other materials containing encrusting matter and from which the lignin, pentosan, resin and like constituents have been substantially removed. The invention further contemplates the acetylation or other esterification of already esterified products and of cellulose ethers.

In order to obtain the best results the cellulosic materials may be pretreated with organic acids, and particularly with lower aliphatic acids such as formic and acetic acids, to increase their reactivity. In the case of wood pulps and other materials containing encrusting matter such as referred to, from which the lignin, pentosan, resin and like constituents have been substantially removed, these are preferably subjected to an alkaline purifying treatment as described in my U. S. Patent 1,711,110 granted April 30, 1929, preferably followed by a pretreatment with organic acids as referred to, prior to the esterification. The alkaline purifying treatment may for example be performed with caustic alkali of low concentration, such as 3% or under with heating or boiling, or with caustic alkali of high concentration such as 5–10% or more, in the cold or with only slight heating.

To obtain the best results the cellulosic materials may be pretreated with organic acids in any suitable manner. Thus, for example, they may be pretreated with the concentrated or dilute acids, particularly formic or acetic acid, as described in my U. S. patent application 1,708,787 issued April 9, 1929, or, as described in my U. S. patent application Serial No. 66,103 filed 31st October 1925, with the vapours of the acids, the vapours being employed alone or mixed with air or other inert gas and being applied as such or being generated by first soaking the cellulosic material in dilute or concentrated solutions of the acids and then blowing or sucking air or other inert gas over or through the material. After the treatment with organic acids, the cellulosic material may be subjected to a stream of air or inert gas or to suction or vacuum to remove the organic acids wholly or partially. Formic acid, except when employed only in small quantities, should be substantially removed, as it reacts with acetic anhydride. I have found that the best results are obtained by employing in the pretreatment either formic acid, such as 80–100% formic acid, or a mixture of formic acid and acetic acid. When stannic chloride or other halide is employed in the subsequent esterification in the absence of hydrochloric or other acid, the cellulosic materials should be pretreated, as described above, with organic acids.

In order to avoid degradation of the cellulose molecule the acetylation or other esterification is preferably carried out at temperatures not exceeding 50° C. The most valuable esters are obtained if the esterification is performed at low temperatures, for example below atmospheric, e. g. 10° C. to 5° or 0° C. or lower, at ordinary temperatures or at temperatures, such as 20° to 30° C., not substantially above atmospheric.

The hydrochloric acid or other hydrohalic acid (when used) may be applied in any suitable form, either in solution or as a gas, and may be introduced after the reaction has been started with stannic chloride or other halide salt, for instance it may be introduced all at once, or in portions at intervals, or continuously during the reaction, but preferably when using such combined condensing agents or catalysts they are allowed to exert their joint action from the commencement of the esterification, i. e. they are both incorporated in the esterifying mixture before the addition of the cellulose or they are both present together with the cellulose before the introduction of the anhydride. The stannic chloride or other halide salt may, if desired, be incorporated in the cellulosic material prior to the acetylation or esterification. This may conveniently be carried out, in the case of pretreating the cellulosic material, by dissolving it in the acid used for the pretreatment.

The esterification may be performed in presence of a solvent for the cellulose ester produced; acetic acid is particularly suitable in the case of manufacturing cellulose acetates but any other suitable solvents (or solvent mixtures) of the cellulose acetates or other cellulose esters may be employed. The acetic acid or equivalent solvent or solvent mixture may be present in any desired quantity, such as 4 to 6 times the weight of the cellulose or near conversion product, but cellulose acetates or other cellulose esters of specially high viscosity can be obtained if the acetic acid or equivalent solvent or solvent mixture is present in an greater than six times, for example 8 to 20 times or more the weight of the cellulose or conversion product as hereinafter referred to. Small quantities,—such for instance as ½ to 10% reckoned on the weight of the cellulose,—of more powerful organic solvents for cellulose acetates or the other cellulose esters, such for example as ethylidene diacetate, lactic acid or its acetyl derivatives, may be added to the acetic acid or other solvent or solvent mixture, as indicated in my U. S. Patent 1,711,111 issued April 30, 1929, or such more powerful solvents may be produced in the acetylation or esterification solution, for example by addition of acetaldehyde to produce ethylidene diacetate by reaction with the acetic anhydride in the case of producing cellulose acetates.

In a previous U. S. Patent 1,708,787 issued April 9, 1929 I have indicated that cellulose acetates of specially high viscosity characteristics can be obtained by conducting the acetylation in presence of acetic acid or equivalent solvents or solvent mixtures in an amount greater than six times, for example 8 to 20 times or more, the weight of the cellulose or cellulose conversion product used. With the present invention likewise the acetylation or esterification may with advantage, for the production of very highly viscous cellulose acetates or other cellulose esters, be conducted in presence of similar large amounts of acetic acid or equivalent solvents or solvent mixtures, for example other higher fatty acids than acetic acid, or other suitable acids, or liquids such as chloroform, tetrachlorethane, or mixtures of such solvents or liquids.

Alternatively the acetylation or esterification may be performed in suspension in liquid diluents, such for example as benzene or toluene. The esterification in suspension may, for instance, be conducted on the lines indicated in my French Patent No. 432,046 and its patents of addition Nos. 15,933 and 16,316. If desired solvents, for example acetic acid, may be present in addition to the liquid diluents. Furthermore acetic acid or equivalent solvent may again be used in quantities over six times the weight of the cellulose, for example 8–20 times or more, to obtain cellulose esters of high viscosity as described in my U. S. Patent 1,708,787 issued April 9, 1929. In all such cases of using solvents in addition to liquid diluents, the liquid diluent should be present in sufficient quantity to prevent solution of the cellulose acetate or other cellulose ester produced.

As a further modification the esterification may be conducted substantially in absence of liquid solvents or diluents by employing vapours of acetic anhydride or other esterifying agent as described in my U. S. patent application Serial No. 72,403 filed 30th November 1925.

Fibres, fabrics or the like for example of cotton or other natural cellulosic materials, or of viscose artificial silk or of other regenerated cellulosic artificial fibres, may be acetylated or esterified by means of the present invention by carrying out the esterification either in suspension in presence of liquid diluents or substantially in absence of liquid solvents or diluents.

The following examples illustrate the invention, but are not to be construed as in any way limiting it.

*Example 1*

100 parts of cotton cellulose are pretreated with formic acid, for example by treatment with 500 to 1000 parts or more of formic acid of about 85%–100% strength, allowing to stand for some hours in the cold and hydro-extracting or by impregnating with about 15 parts of formic acid of 75–85% strength and then allowing to stand for about 8–12 hours at ordinary temperature. If desired the material may then be washed with water, benzol or the like to remove the formic acid and centrifuged or dried. The 100 parts of pretreated material are introduced in the acetylator into a mixture of 600 parts of acetic anhydride, 600 parts of acetic acid, 10 parts of stannic chloride and 10 parts of hydrochloric acid, (calculated as HCl) either in the form of the fuming aqueous solution (35% strength) or in solution in the acetic acid, and the mass is constantly mixed or stirred during the reaction, which is conducted at about ordinary atmospheric temperature. The acetylation proceeds smoothly and a clear solution is obtained. The solution may either be used directly or the cellulose acetate may be precipitated and redissolved or worked up in any desired manner.

Example 2

100 parts of cotton cellulose pretreated as in Example 1 are introduced in the acetylator into a mixture of 800 parts of acetic acid, 300 parts of acetic anhydride and 20 parts of stannic chloride. The reaction is carried out in the cold with constant mixing or stirring. A clear solution is obtained of a cellulose acetate of very high viscosity.

Example 3

100 parts of cotton cellulose are introduced in the acetylator into about 800 parts of glacial acetic acid and the whole heated up to 80° C. and maintained at 80°–100° C. for about 12 hours. The contents of the acetylator are then cooled or allowed to cool to about 20° C. and 10 parts of stannic chloride and 10 parts of hydrochloric acid (calculated as HCl) either as 35% aqueous solution or in acetic acid solution are added, and finally 1500 parts of benzene mixed with 300 parts of acetic anhydride are introduced. The reaction is conducted at about 20°–40° C. with constant mixing or stirring of the mass.

Example 4

100 parts of cotton cellulose are introduced in the acetylator into a mixture of 800–1000 parts of acetic acid, 400 parts of acetic anhydride, 10 parts of stannic chloride, 10 parts of ferric chloride and 10 parts of hydrochloric acid (calculated as HCl) either in the form of aqueous solution (e. g. 35%) or in solution in the acetic acid, the reaction being then conducted in the cold with constant stirring or mixing. A solution is obtained of a cellulose acetate of high viscosity.

In a similar manner stannic bromide or stannic iodide may be used with or without halides of iron, cobalt, nickel, manganese or copper to effect the acetylation and furthermore by employing the appropriate anhydride or anhydrides other cellulose esters or mixed esters may be obtained. It is found that as compared with prior processes, the use of stannic halides as catalysts much facilitates the production of cellulose esters of higher fatty acids, e. g. propionic acid.

The cellulose acetates or other cellulose esters resulting from acetylation or other esterification according to the invention may be used in their esterification solutions or in solutions of the primary esterification products for the production of artificial silks, films, etc. or they may be subjected to secondary treatments or reactions for the purpose of changing their solubilities. The secondary treatments or reactions may be carried out in the primary esterification solutions or suspensions preferably without neutralizing the hydrochloric or other hydrohalide acid, if present, and preferably without eliminating the stannic chloride or other halide used and after destroying if necessary any remaining anhydride by the addition of water or other anhydride-destroying agents, such for instance as hydroxyl derivatives, oxy acids, for instance lactic acid, alcohols etc. If no acid be used in the esterification, hydrochloric or other hydrohalide acid may, if desired, be added to accelerate the reaction. Alternatively, the esters either precipitated from the primary esterification solutions or those obtained other than in solution, may be dissolved or suspended and then subjected to the secondary treatments. The secondary treatments or reactions may be carried out with or without addition of inorganic or organic acids, acid salts or other suitable agents for promoting the secondary treatment or reaction, the treatment in any case being stopped when the required solubility has been reached. It is particularly advantageous to conduct the further treatments or reactions in the joint presence of hydrochloric acid and stannic chloride or other catalysts used according to the present invention, either in the primitive esterification solutions or suspensions or after separation therefrom. For the further treatments or reactions one should first destroy any remaining acetic anhydride or other esterifying anhydride that may remain in the esterification solution or suspension or in the primary ester, by adding water or other anhydride-destroying agents to the esterification solution or to the solutions or suspensions of the primary ester.

While the secondary or further treatments of the primary esterification products may with advantage be conducted at ordinary or moderate temperatures, one may if desired quicken the reaction by heating up to relatively high or high temperatures, even up to 80° or 100° C., but in such cases the presence of free mineral acids is preferably avoided.

The secondary or further treatments of the primary esterification products will be stopped when the particular solubility desired is reached. To obtain acetone solubility it is in general unnecessary to carry the secondary or further treatments so far as hitherto and consequently the acidyl content of the acetone-soluble esters may be higher, for example, at least 56%, calculated as acetic acid. This is probably the reason for the remarkable properties hereinafter referred to of the filaments and the like obtained from the new esters.

An important advantage of the present invention is the fact that the cellulose acetates or other esters can be employed in their primary esterification solutions in their different stages or phases of acetylation, for the production of artificial silks and the like, films, celluloid-substitutes or other thermoplastic masses, moulding powders or articles etc.

Further the invention permits of obtaining cellulose esters of high quality which are soluble in acetone or in very low boiling solvents, for instance methyl formate, acetaldehyde, formaldehyde etc. Also suitable high boiling solvents or plasticising or softening agents can be readily incorporated with them or their solutions in volatile solvents and/or very low boiling solvents.

The new cellulose acetates or other esters, either in their primary esterification solutions and with or without secondary treatments or as primary or secondary esters in solution in suitable solvents, for example acetone, ethyl alcohol-acetone, methyl alcohol-acetone, or the very low boiling solvents referred to above or in mixtures of such solvents, may be employed for the production of artificial silks or fibres, films, etc. For either wet or dry-spinning processes the esters may be employed in the form of solutions of relatively low concentration for instance 5–8% or of medium concentration, for example 10–20%, or of high concentration containing over 20%, e. g. 25–30% or more.

The artificial silks and the like produced from the new secondary esters of high ester content are found to be much more resistant to delustering by hot or boiling aqueous liquids or moist steam than the cellulose ester products hitherto produced and may even resist delustering altogether.

What I claim and desire to secure by Letters Patent is:—

1. Process for the production of cellulose esters, comprising esterifying material consisting essentially of cellulose in presence of stannic halide.

2. Process for the production of cellulose esters, comprising esterifying material consisting essentially of cellulose by means of fatty acid anhydrides in presence of stannic chloride.

3. Process for the production of cellulose esters, comprising esterifying material consisting essentially of cellulose by means of fatty acid anhydrides in presence of stannic halide and a hydrohalic acid.

4. Process for the production of cellulose esters, comprising esterifying material consisting essentially of cellulose by means of fatty acid anhydrides in presence of stannic chloride and hydrochloric acid.

5. Process for the production of cellulose acetate, comprising acetylating material consisting essentially of cellulose by means of acetic anhydride in presence of stannic chloride.

6. Process for the production of cellulose acetate, comprising acetylating material consisting essentially of cellulose by means of acetic anhydride in presence of stannic chloride and hydrochloric acid.

7. Process for the production of cellulose esters, comprising pretreating material consisting essentially of cellulose with organic acids and esterifying them by means of fatty acid anhydrides in presence of stannic halide.

8. Process for the production of cellulose acetate, comprising pretreating material consisting essentially of cellulose with lower aliphatic acids and acetylating them by means of acetic anhydride in presence of stannic chloride.

9. Process for the production of cellulose acetate, comprising pretreating material consisting essentially of cellulose with lower aliphatic acids and acetylating them by means of acetic anhydride in presence of stannic chloride and hydrochloric acid, each in a proportion of 5–15% of the weight of the cellulose.

10. Process for the production of cellulose acetate, comprising pretreating material consisting essentially of cellulose with formic acid and acetylating them by means of acetic anhydride in presence of stannic chloride and in presence of a solvent for the acetate produced in quantity at least six times the weight of the cellulose.

11. Process for the production of cellulose esters, comprising esterifying material consisting essentially of cellulose in presence of stannic halide and then subjecting the esters produced to secondary treatment for the purpose of changing their solubilities.

12. Process for the production of cellulose acetate, comprising pretreating material consisting essentially of cellulose with lower aliphatic acids and acetylating them by means of acetic anhydride in presence of stannic chloride and then subjecting the acetate produced to secondary treatment for the purpose of changing its solubilities.

13. Process for the production of cellulose acetate, comprising pretreating material consisting essentially of cellulose with lower aliphatic acids and acetylating them by means of acetic anhydride in presence of stannic chloride and hydrochloric acid, each in a proportion of 5–15% of the weight of the cellulose and then subjecting the acetate produced to the further action of the said catalyst to change its solubilities.

14. Cellulose esters prepared by esterifying material consisting essentially of cellulose in presence of stannic halide.

15. Cellulose acetate produced by acetylating material consisting essentially of cellulose by means of acetic anhydride in presence of stannic halide.

HENRY DREYFUS.